(12) United States Patent
Palatov

(10) Patent No.: US 11,380,942 B2
(45) Date of Patent: Jul. 5, 2022

(54) HIGH VOLTAGE BATTERY MODULE WITH SERIES CONNECTED CELLS AND INTERNAL RELAYS

(71) Applicant: Dennis Palatov, Portland, OR (US)

(72) Inventor: Dennis Palatov, Portland, OR (US)

(73) Assignee: PALATOV GROUP LLC, Portland, OR (US)

( * ) Notice: Subject to any disclaimer, the term of this patent is extended or adjusted under 35 U.S.C. 154(b) by 0 days.

(21) Appl. No.: 17/086,865

(22) Filed: Nov. 2, 2020

(65) Prior Publication Data

US 2022/0140409 A1 May 5, 2022

(51) Int. Cl.
*H01M 50/502* (2021.01)
*H01M 10/42* (2006.01)

(52) U.S. Cl.
CPC ..... *H01M 10/4257* (2013.01); *H01M 50/502* (2021.01); *H01M 2010/4271* (2013.01); *H01M 2010/4278* (2013.01); *H01M 2220/20* (2013.01)

(58) Field of Classification Search
CPC .......... H01M 10/4257; H01M 50/502
See application file for complete search history.

(56) References Cited

U.S. PATENT DOCUMENTS

| | | | |
|---|---|---|---|
| 9,893,385 B1 | 2/2018 | Nayar et al. | |
| 2012/0194004 A1 | 8/2012 | Lim | |
| 2013/0093427 A1* | 4/2013 | Bemrich | G01R 31/3278 324/418 |
| 2014/0141287 A1* | 5/2014 | Bertucci | H02J 7/0042 429/7 |
| 2014/0183939 A1* | 7/2014 | Jiang | B60L 7/10 307/9.1 |
| 2014/0312828 A1 | 10/2014 | Vo et al. | |
| 2017/0359634 A1 | 12/2017 | Stampfl et al. | |
| 2019/0067961 A1 | 2/2019 | King et al. | |
| 2019/0089168 A1 | 3/2019 | Yeom | |
| 2019/0273232 A1 | 9/2019 | Fu et al. | |
| 2019/0299799 A1 | 10/2019 | Hinterberger et al. | |

* cited by examiner

*Primary Examiner* — Olatunji A Godo

(57) ABSTRACT

A battery module is disclosed having a plurality of series-connected battery cells contained in, and electrically isolated from, an enclosure, with a first internal relay to control connection between cells and a positive terminal, and a second internal relay to control the connection between cells and a negative terminal. A control signal input is provided to control the relays. An embodiment is disclosed having an internal battery management system which controls the relays in response to a digital message. A modular battery pack is disclosed consisting of a plurality of modules connected in parallel, which can be individually and independently activated and deactivated. A method is provided for activating an individual module.

16 Claims, 5 Drawing Sheets

HIGH VOLTAGE BATTERY MODULE WITH SERIES CONNECTED CELLS AND INTERNAL RELAYS

BACKGROUND OF THE INVENTION

There is a rapidly growing demand for converting a wide variety of vehicle types to electric propulsion. In order to deliver the best performance and efficiency, the electric drivetrains of such vehicles need to operate at a direct current (DC) high voltage. Systems operating at a nominal 400V DC are now common, and higher performance designs using 800V DC and above are being put into service.

The battery packs to power such systems are increasing in capacity. Packs of over 70 KWh are now common, and some can deliver over 2,000 A of current. Such levels of power can present many life-threatening hazards both during ordinary assembly and service operations, as well as rescue operations by emergency personnel when electric vehicles are involved in a crash or other adverse event.

Exposure to moisture through condensation, precipitation, or accidental submersion can cause a short in the pack and lead to a fire or explosion.

Large capacity packs typically require a plurality of individual small cells, groups of which are connected in parallel to achieve desired current capability, and multiple groups are then connected in series to achieve the desired voltage. Because a large number of cells is typically needed, resulting in substantial weight and bulk, vehicle battery packs are often constructed of modules. A typical known battery module design is a fraction of a pack, sized to facilitate handling, and often having a module voltage that is considered to be non-hazardous in contact with human skin, below approximately 50V, although some higher-voltage modules are known.

A new trend in automotive battery design, exemplified by Tesla and others, is to move away from modular construction and create monolithic battery packs, comprised directly of cells and meant to be non-serviceable. While this may be practical in mainstream automotive applications, in high performance vehicles which see severe use as part of ordinary operation, this approach is undesirable.

In modular packs known in the art, the lower-voltage modules are commonly connected in series within the pack, to achieve the desired pack voltage. A pack typically has an enclosure and safety devices such as relays, fuses, battery management system, current sensing devices, isolation monitoring devices, and the like, contained within the enclosure. Typically, the safety devices are external to the modules and only one set of safety devices is shared by all the modules in the pack, to reduce cost and manufacturing complexity. These features keep the overall pack safe as long as it is not opened for service and its integrity is not compromised by an accident or other adverse circumstance such as water ingress.

While individual modules known in the art may have a lower voltage than the overall pack, they feature groups of cells connected in parallel and therefore have a large current capability, typically equal to the desired current capability of the overall pack. This characteristic makes it impractical to add relays to each module, due to expense of high-current relays and increased resistance that would add up when multiple modules are connected in series. As a result, modules known in the art have external terminals that are always connected to the cells comprising the module. With large current capability, a short across the external terminals can result in very large amount of energy being released and carries a high risk of fire, serious injury, as well as potential damage to the module.

While not commonly practiced in vehicle battery packs, connecting high voltage modules in parallel is known in the art. In U.S. Pat. No. 10,333,328 to Hom et al., Hom teaches a multi-battery charging station, connecting a plurality of batteries in parallel. Hom teaches a diode or electrical switch within each battery to manage selective connection of each battery to the common power bus for charging. The objective of the invention taught by Hom is to provide a method of connecting multiple batteries having different states of charge to a common power bus. Hom does not contemplate the safe handling of individual batteries, and therefore does not anticipate isolating both external terminals from the cells within a battery. Hom does not contemplate the internal structure of each battery from a safety perspective. However, the method taught by Hom of managing dissimilar states of charge of parallel connected batteries is an example of known methods in the art for managing such conditions.

A further drawback of module or pack construction that utilizes groups of cells connected in parallel is the fact that if one cell in such group develops an internal short, which is a known failure mode resulting from dendrite growth, the full current of all the other cells in the group will flow through the failed cell. This can lead to rapid overheating and a resulting explosion or fire. In order to mitigate this risk, individual cells are typically connected to a common bus bar by means of fusible links. The fusible links have a resistance that causes heat to be generated as current is increased. Once enough heat is generated to melt the link, the connection is broken and the current into the failed cell is permanently interrupted. A key drawback of this approach is that in ordinary use the inherent resistance of the fusible links leads to unwanted heat generation and overall energy loss in the pack when operating at high current levels.

Another undesirable effect of a plurality of cells connected in parallel within a module is that if one of the cells develops excessive self-discharge, which is a known defect, then all the cells in parallel with it will discharge through the defective cell over time. This will reduce the state of charge of the entire group, as a percentage of maximum. Because multiple parallel groups are typically connected in series to form a pack, the overall pack usable capacity at any given time, as a percentage of maximum, is limited by the state of charge of the lowest group. This is due to the fact that energy is removed at the same rate from all the series connected groups of parallel cells.

Over-discharging the lowest group will lead to permanent damage of the group and therefore the entire pack. Discharge must consequently be stopped when lowest allowable state of charge of the lowest group is reached, even though the other groups may still retain higher state of charge. In this way, a single defective cell in a pack constructed according to methods currently practiced in the art can result in effectively degrading the capacity of the entire pack. Servicing such packs is hazardous and requires specialized training and equipment and is usually not practical.

As commonly practiced in the art, vehicle pack design is an engineering tradeoff of cost, manufacturing efficiency, and safety. Because cost and manufacturing efficiency are the highest priorities, safety is mostly considered in the context of a pack when installed in a vehicle and in ordinary use. Vehicle battery packs known in the art are extremely hazardous when opened for service or compromised in a crash or other adverse event. In those circumstances handling of the packs requires highly trained personnel and specialized equipment to prevent potentially extensive damage, injury, or even death.

There is a demand to provide electric propulsion for a broad range of high performance vehicles such as off-road, recreational, light marine and light aircraft. Such vehicles see extreme use in ordinary operation, involving frequent crashes and requiring extensive service. Therefore, the designs and priorities employed in construction of mainstream automotive battery packs are not practical in such applications.

What is needed in the arts of vehicle batteries is a vehicle battery module design that is safe to handle without specialized training or equipment, does not create a hazard when compromised by an adverse event, allows economical and practical construction of high voltage, high current battery packs, provides for graceful degradation of the assembled pack, allows for easy and economical pack service without specialized training and equipment, and minimizes risk of fire and energy loss in operation.

SUMMARY OF THE INVENTION

A first objective of the present invention is to provide a high voltage battery module suitable for use in vehicles that is safe to handle and transport without specialized training or equipment. A further objective of the present invention is to provide a modular pack design that is fault tolerant, provides graceful degradation in case of cell or module failure, and allows for rapid replacement of failed or discharged modules by ordinary users without specialized training or equipment. Yet another objective is to provide a high voltage module that minimizes risk of a hazard when compromised by a crash, submersion, or other adverse event.

To achieve the objectives, a battery module of the present invention comprises an enclosure containing a plurality of series-connected cells which are electrically isolated from the enclosure. A positive and a negative electrical terminal are provided, both said terminals being electrically isolated from said enclosure, and also from said plurality of cells. A first normally-open electrical relay is provided to electrically connect the positive side of the series connected cells to the positive terminal. A second normally-open electrical relay is provided to connect the negative side of the series connected cells to the negative terminal. Many types of relays are known in the art, including electromechanical and solid state.

A voltage potential can only exist between the negative and the positive terminals of the module when both said relays are closed at the same time, and current can only flow under that condition. An activation means for the relays is provided via a connection between the module and an external control bus.

In some embodiments relay activation is achieved by supplying an external activation voltage to relays via the control bus. In other embodiments, activation of the relays is controlled by a battery management system inside the module enclosure, responsive to electronic messages received by means of the control bus. Battery management systems which receive messages from a control bus are well known in the art.

When both relays are deactivated which is the default state, the module is in a safe condition. An external short between positive and negative terminals, or one between either of the terminals and the enclosure, would not generate a hazardous condition. Further, if the module is physically compromised by a penetrating object that creates a short between the series connected cells and the enclosure, a hazardous condition still would not be created since both positive and negative terminals are electrically isolated from both the enclosure and the series connected cells.

Since all the cells in the module of the present invention are connected in series, an internal short in one or more cells, such as one due to growth of dendrites, would not create a hazardous condition or thermal runaway.

A method is disclosed for activating the relays in response to a message only for a predetermined period of time. If a new message is not received within that time, the relays are deactivated until a valid activation message is received. The method of the present invention ensures that in the event of an external system failure or communication loss, such as may occur in a crash or other adverse situation, the module is quickly rendered safe and remains in the safe condition until deliberately activated.

Because the method of the present invention requires a constant stream of timely activation messages for relays to be activated, it is extremely unlikely that a module would be accidentally or carelessly rendered unsafe by activation of both relays during handling, storage, or transport.

BRIEF DESCRIPTION OF THE DRAWINGS

The present invention is described herein with reference to the following drawings. The components in the drawings are not necessarily to scale relative to each other. Like reference numerals designate corresponding parts throughout the several views.

DETAILED DESCRIPTION

Figure 1:
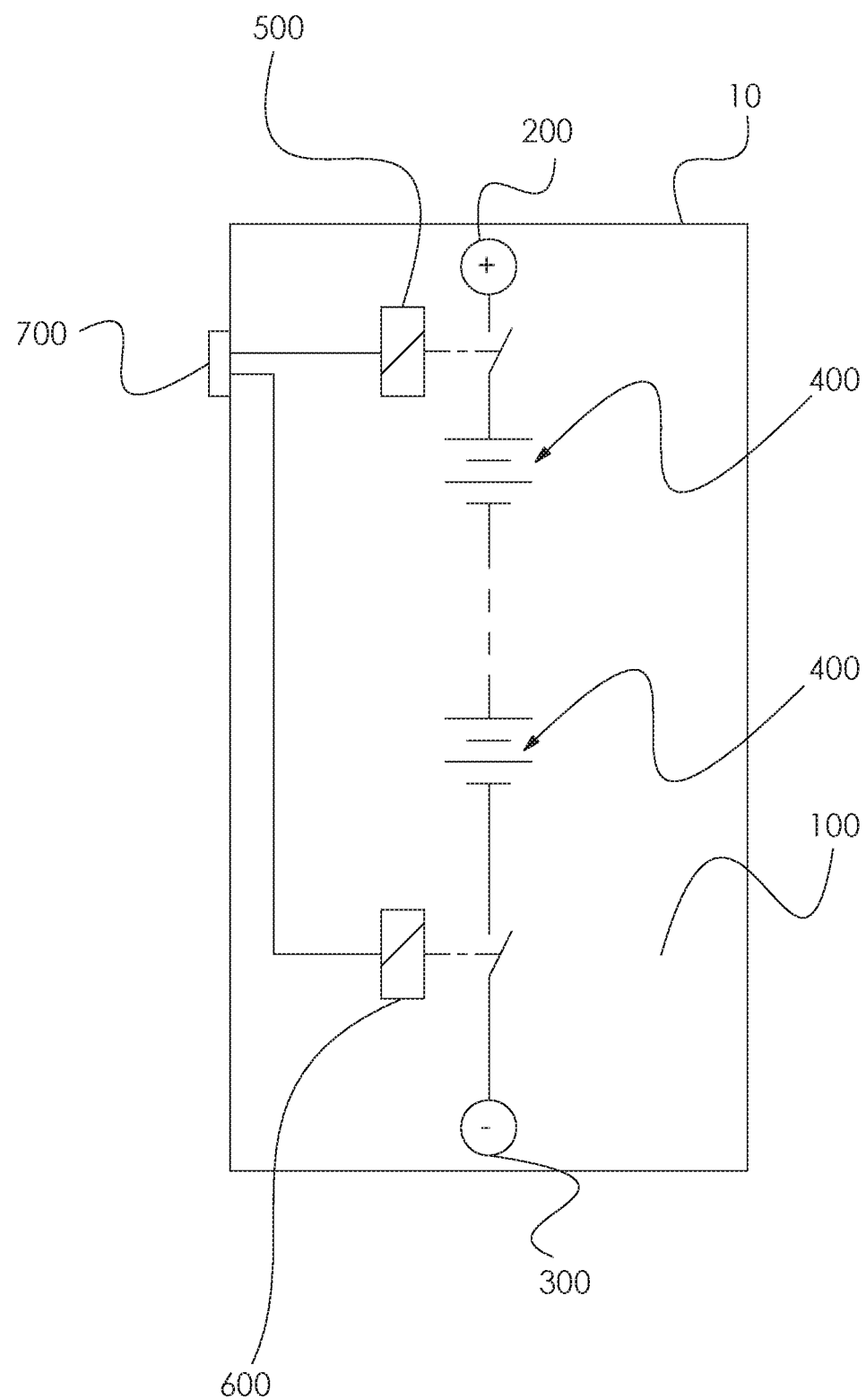
FIG. 1 is an illustration of an embodiment of a battery module utilizing electromechanical relays.

An embodiment of the present invention is illustrated in FIG. 1 is the most basic embodiment of the invention. The battery module 10 comprises an enclosure 100, a plurality of series connected cells 400, a positive terminal 200, and a negative terminal 300. In default configuration, all the said components are electrically isolated from all others, no voltage potential exists on the exterior of the pack, and no current can flow if any of said components are connected by an external electrical short.

The disclosed systems and methods for securing a battery module 10 will become better understood through review of the following detailed description in conjunction with the figures. The detailed description and figures provide examples of the various inventions described herein. Those skilled in the art will understand that the disclosed examples may be varied, modified, and altered without departing from the scope of the inventions described herein. Many variations are contemplated for different applications and design considerations, however, for the sake of brevity, each and every contemplated variation is not individually described in the following detailed description.

Throughout the following detailed description, a variety of examples for systems and methods for the battery module 10 are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, elements or method steps not expressly recited.

Terms such as "first", "second", and "third" are used to distinguish or identify various members of a group, or the like, and are not intended to denote a serial, chronological, or numerical limitation.

"Coupled" means connected, either permanently or releasably, whether directly or indirectly through intervening components.

"Communicatively coupled" means that an electronic device is communicatively connected to another electronic device, either wirelessly or with a wire based connector, whether directly or indirectly through a communication network 108. "Controllably coupled" means that an electronic device controls operation of another electronic device.

"Activation message", "activation command" and "activation voltage" are used interchangeably to indicate a control signal received via control bus connection to cause the activation of relays contained within the module, by a mechanism appropriate for the specific embodiment of the module.

The battery module 10 illustrated in FIG. 1 further comprises an electromechanical relay 500, configured to electrically connect the positive end of series connected cells 400 to positive terminal 200, when the relay 500 is activated. An electromechanical relay 600 is further provided, configured to electrically connect the negative end of series connected cells 400 to negative terminal 300, when the relay 600 is activated.

In the non-limiting example embodiment of FIG. 1, two series connected cells 400 are illustrated. In other embodiments, any suitable number of cells 400 may be serially connected together in a battery module 10.

A control bus connection 700 is further provided. In this embodiment, applying an external control voltage and/or current to the control bus connection 700 activates both relays 500 and 600, thereby electrically connecting internal series connected cells 400 to the positive terminal 200 and negative terminal 300. The applied control voltage and/or current is referred to herein as a control signal input. The full combined voltage of the plurality of series connected cells is then present between the negative and positive terminals, and current can flow when an external load is connected between the terminals.

Figure 2:
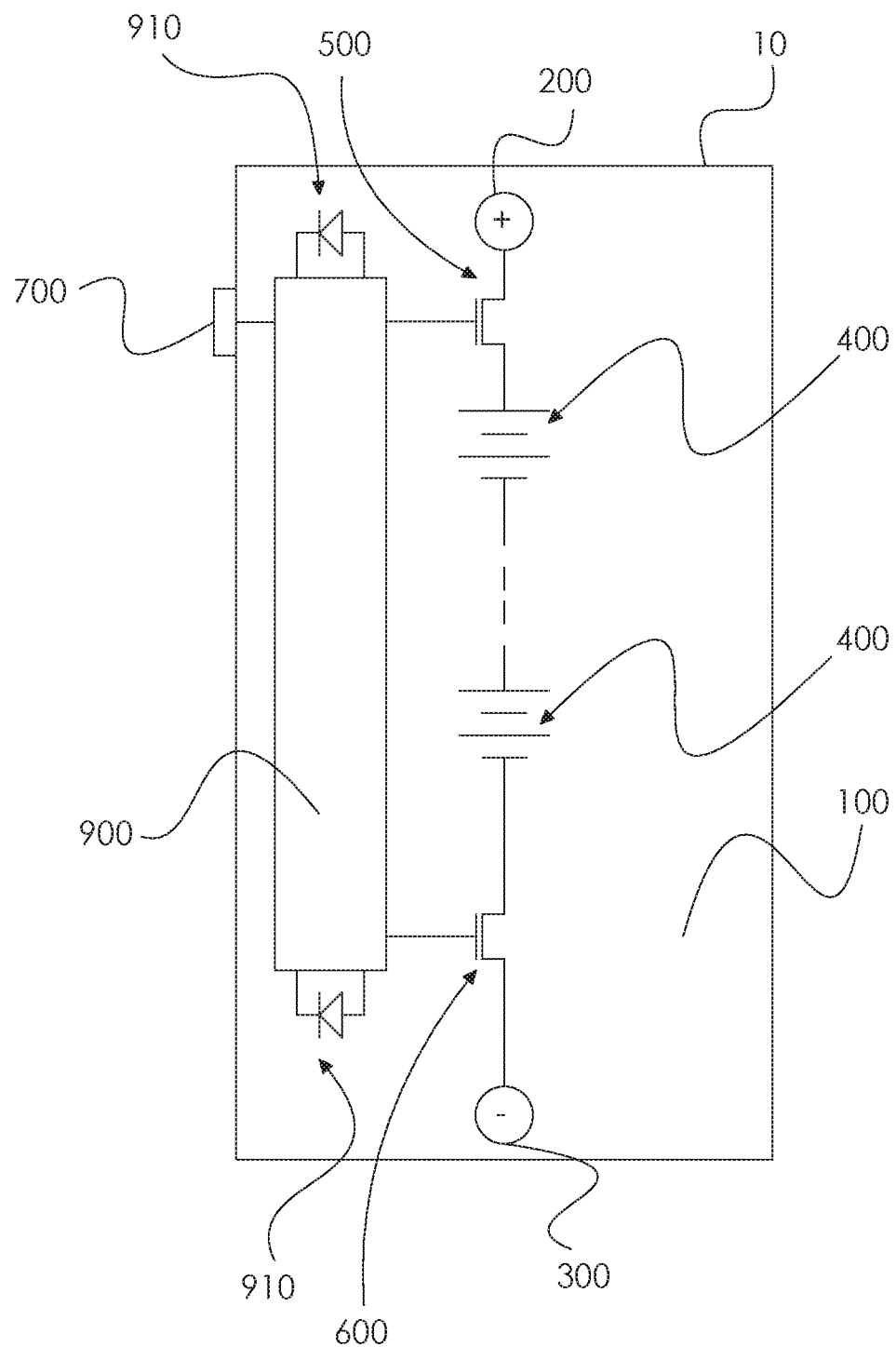
FIG. 2 is an illustration of an embodiment of a battery module utilizing a battery management system and solid state relays.

Another embodiment of the present invention is illustrated in FIG. 2. Its function is similar to that of the embodiment illustrated in FIG. 1, with the following differences and enhancements. In the non-limiting example embodiment of FIG. 2, two series connected cells 400 are illustrated. In other embodiments, any suitable number of cells 400 may be serially connected together in a battery module 10.

A battery management system 900 is shown in FIG. 2, said system being configured to control both the solid state relay 500 and solid state relay 600. The battery management system 900 is connected to control bus connection 700 and is configured to receive digital messages via said control bus connection 700 (interchangeably referred to herein as a digital communications port). The digital messages are referred to herein as a control signal input. Many examples use such busses, including control area network (CAN) bus, are known in the art. In some embodiments the control bus may be wireless, such as Bluetooth or similar, and the control bus connection 700 may be an antenna.

Visual indicators 910, which may be of light emitting diode (LED) type, are further optionally provided to indicate battery status information, such as an activation status to indicate when solid state relays 500 and 600 are activated, and therefore to indicate when a voltage is present across terminals 200 and 300. Visual indicators 910 may be included in alternative embodiments, such as the non-limiting example embodiment illustrated in FIG. 1.

As with the previously illustrated embodiment, the default configuration is for the relays to be deactivated and all externally accessible components be electrically isolated from each other and the series connected plurality of cells. Relays are only activated by the battery management system in response to receipt of a valid activation message via the control bus.

Figure 3:
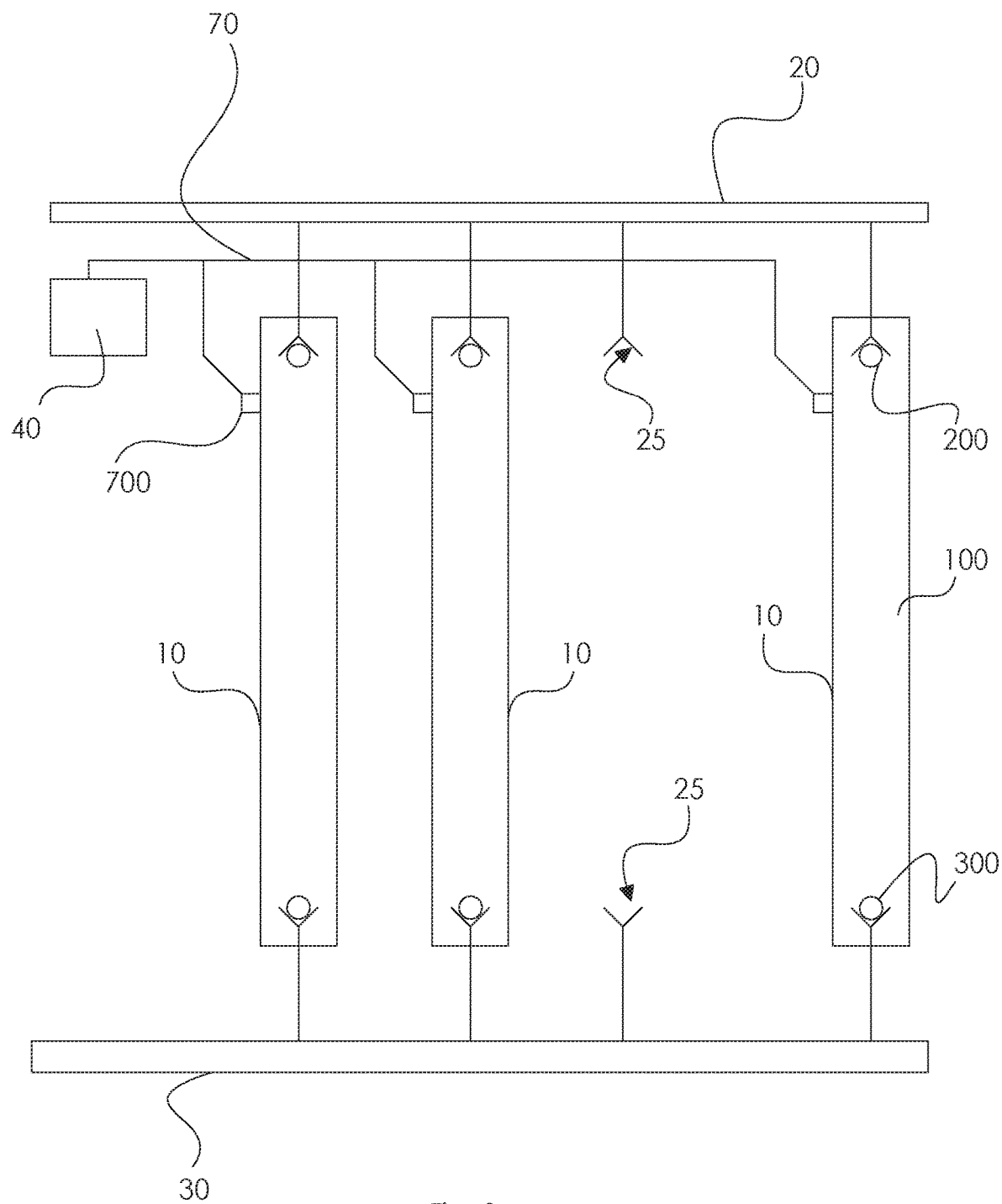
FIG. 3 shows an embodiment of a battery pack having a plurality of modules.

FIG. 3 illustrates connecting a plurality of modules 10 in parallel to positive power bus 20 and the negative power bus 30 by means of connectors 25. Power bus construction and connectors are well known in the art and many types can be used without departing from the scope of the invention.

The embodiment illustrated in FIG. 3 further provides a pack controller 40 connected to each of the plurality of modules 10 by a control bus connection 70. Many types of controllers and control busses are known in the art, with CAN bus being particularly common.

The unique configuration of the modules of the present invention facilitates new unique methods to be employed, in particular with the priority on safety of operation. The method of operating a module of the present invention is disclosed herein and illustrated in FIG. 5.

The key aspect of the module of the present invention is that both of the two relays 500, 600 are deactivated and the module is in a safe condition, unless specifically commanded to activate by means of the control bus that is external to the module 10. The method of the present invention utilizes this aspect, and specifies that the relays 500, 600 are activated in response to an activation command received in step A (FIG. 5) only for a short predetermined activation duration period that is set in step D responsive to the information contained in the activation command.

Figure 5:
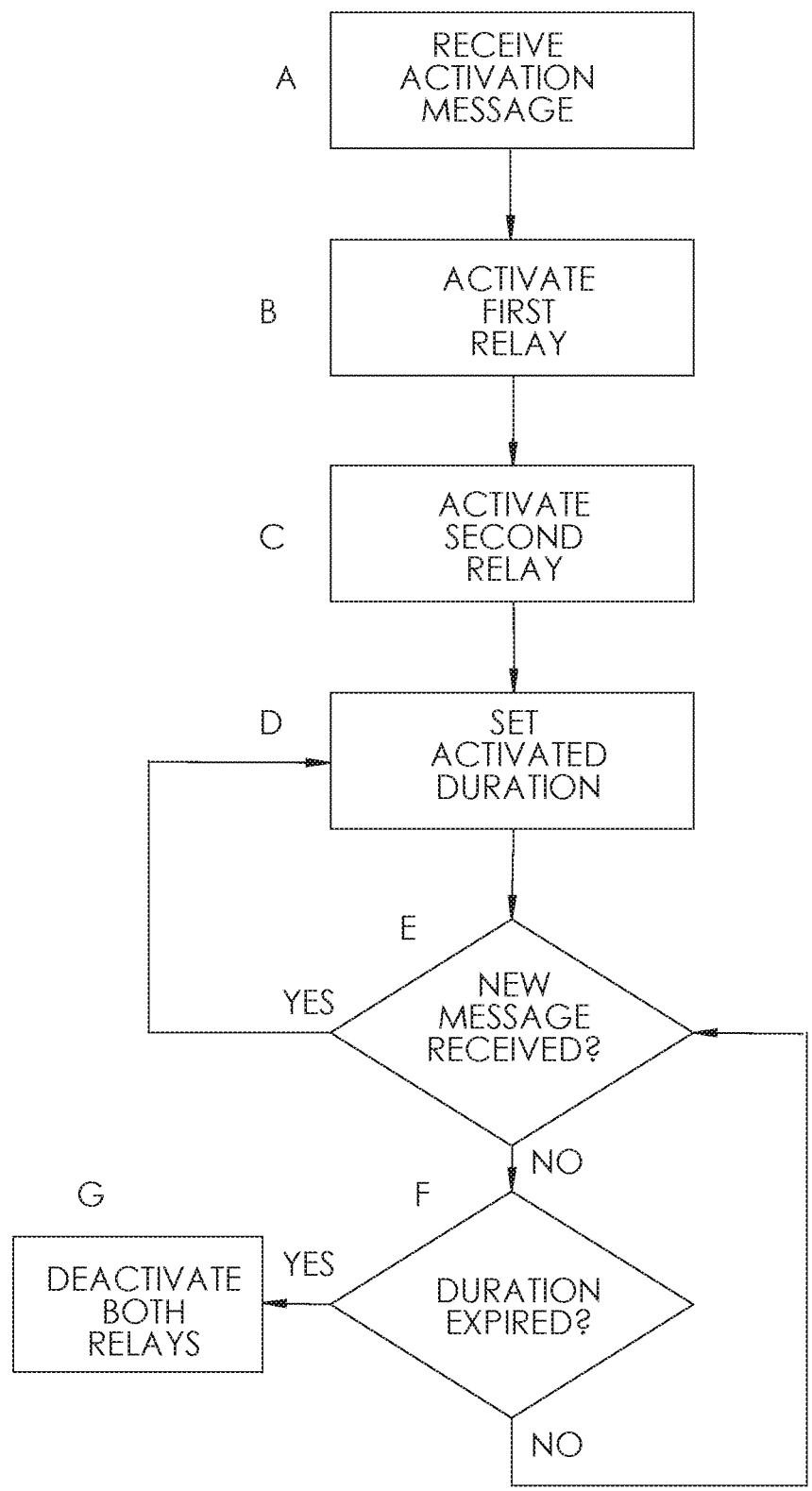
FIG. 5 illustrates a flow chart of a process used by an example embodiment.

As conceptually illustrated in FIG. 5, the first relay 500 is activated in step B, and the second relay 600 is activated in step C. Steps B and C may be concurrently performed, or may be sequentially performed, depending upon the embodiment. Some embodiments may further conduct safety and status checks as part of steps B and C, or between, or subsequent to those steps. Many types of such checks may be used in the various embodiments, including isolation monitoring and excess current and voltage detection.

If a new valid activation command is received prior to expiration of the set duration, the method is repeated by proceeding to step D.

If no new activation command is received by the module prior to the expiration of said predetermined activation duration period that was set in step D, the relays are deactivated and the module is rendered to a safe condition until a new valid activation command is received.

When a high voltage module is connected to a power bus, it may be advantageous to limit the maximum current that is allowed to flow. For example, if large capacitive load is connected to the power bus, the inrush current to charge the capacitors to the module voltage may be excessive unless specifically limited.

In some embodiments, the method disclosed herein may be employed to limit the current by setting the active duration to a very short activation duration period, allowing a brief spike in current followed by a longer deactivated duration period. An inductor may be employed to moderate the current. Any suitable pulse width modulation may be used in the various embodiments, and is facilitated by the module 10 of the present invention. The duration of the activation duration period may in some embodiments be set based on a threshold voltage or the like that may be defined in proportion to the difference between power bus voltage and module voltage. This method results in very short activated durations when the difference in voltage is large, progressively increasing activated duration until voltages are substantially equal, at which point activation becomes substantially constant by setting activated duration greater than the time interval at which command messages are sent. Operational control of the relays 500, 600 facilitate this unique and improved method of controlling the modules 10.

Figure 4:
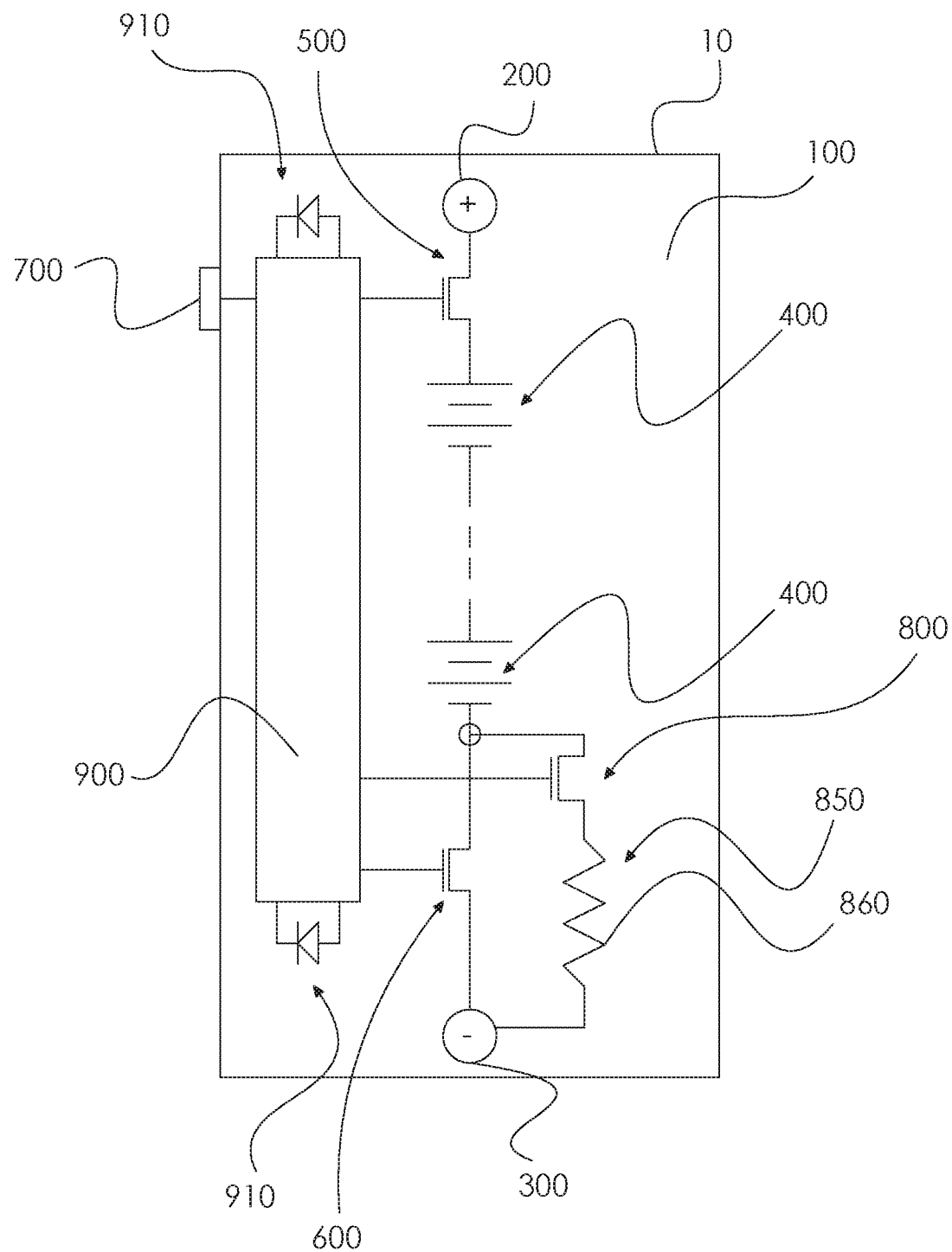
FIG. 4 illustrates an embodiment of a module also having a current limited path.

In other embodiments, it may be desirable to provide a separate current limited path within the module 10. Such an embodiment is illustrated in FIG. 4. A third relay 800 is provided to make the connection between one of the external terminals and the series connected plurality of cells by means of current limited circuit 850. The current limited circuit contains a current limiting impedance 860 (that may be comprised of a resistance). Either positive or negative terminal can be thus connected. In the non-limiting embodiment illustrated in FIG. 5, the current limiting circuit 850 is illustrated as being connected to the negative terminal 300. The current limiting circuit 850 can be of any known type, including a resistor, an inductor, a switching regulator, or similar.

In embodiments utilizing a current limited path, control of the current limiting circuit 850 is provided to select between the limited current path or a full current path. In embodiments utilizing a battery management system and a digital control bus, this control of the current limiting circuit 850 may be by managed by communicating a control signal having information contained within an activation command. Embodiments utilizing electromechanical relays may typically provide a separate limited current activation circuit within the control bus connection 700. In the example embodiment illustrated in FIG. 4, the control signal is conceptually illustrated as being provided by the battery management system. In other embodiments, the control signal to the current limiting circuit 850 may be separately provided by another controller within the vehicle.

The method of the present invention improves safety in a novel manner by requiring that each of the plurality of modules 10 receive a new activation command prior to the expiration of the active duration set responsive to the previous activation command in order to remain activated. Any malfunction in the controller 40 or loss of communication via control bus 70 would result in all connected modules being automatically deactivated at the expiration of the last set activated duration.

The embodiments disclosed herein are illustrative and not limiting; other embodiments shall be readily apparent to those skilled in the art based upon the disclosures made herein, without departing from the scope of the present invention.

It should be emphasized that the above-described embodiments of the battery module 10 are merely possible examples of implementations of the invention. Many variations and modifications may be made to the above-described embodiments. All such modifications and variations are intended to be included herein within the scope of this disclosure and protected by the following claims.

Furthermore, the disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower, or equal in scope to the original claims, are to be considered within the subject matter of the inventions described herein.

The invention claimed is:

1. A battery module for a modular battery pack, said modular battery pack having a positive power bus, a negative power bus, a control bus, and a plurality of battery modules, wherein the plurality of battery modules are connected in parallel between the positive power bus and the negative power bus of the modular battery pack, and wherein each battery module comprises:
   an enclosure,
   a plurality of series connected battery cells contained within said enclosure, said plurality of series connected battery cells being electrically isolated from said enclosure, and wherein the plurality of series connected battery cells is defined by a first battery cell, at least one intervening battery cell, and a last battery cell;
   a positive terminal configured to be coupled to the positive power bus of the modular battery pack via a first connector,
   a negative terminal configured to be coupled to the negative power bus of the modular battery pack via a second connector, a first relay contained within said enclosure and connected between a positive terminal of the last battery cell and the positive terminal of the battery module, wherein the first relay controls connection of said plurality of cells to said positive terminal, a second relay contained within said enclosure and connected between a negative terminal of the first battery cell and the negative terminal of the battery module, wherein the second relay controls connection of said plurality of battery cells to said negative terminal, and a control bus connection configured to be coupled to the control bus of the modular battery pack, said control bus connection providing a control signal input for activating said first relay and said second relay, said control bus connection being electrically isolated from said plurality of battery cells, wherein the plurality of series connected battery cells are connected to the positive terminal of the battery module and the negative terminal of the battery module in response to said first relay and said second relay receiving the control signal input.

2. The battery module of claim 1 wherein said first relay and said second relay are electromechanical.

3. The battery module of claim 1 wherein said first relay and said second relay are solid state relays.

4. The battery module of claim 1 further comprising a battery management system, said battery management system further comprising a digital communications port, said digital communications port being configured to be coupled to the control bus of the modular battery pack via the control bus connection, wherein the battery management system is configured to activate at least a one of the first relay and the second relay responsive to receiving a message via the digital communications port, and wherein the battery management system is further configured to deactivate the one of the first relay and the second relay responsive to expiration of an activation duration period.

5. The battery module of claim 4 further wherein said battery management system is configured to control said first relay and said second relay.

6. The battery module of claim 5 wherein said battery management system is configured to control said first relay and said second relay responsive to a message received by means of said digital communications port.

7. The battery module of claim 4 wherein said battery management system is configured to transmit battery status information by means of said digital communications port.

8. The battery module of claim 1 further comprising a third relay, wherein said third relay controls connection between said plurality of battery cells and at least one of said terminals, via a current-limiting circuit.

9. The battery module of claim 1, further comprising a visual indicator responsive to activation status of at least one of said relays.

10. The battery module of claim 1 wherein said control bus connection is an antenna for wirelessly receiving control inputs.

11. A method of activating a battery module, said battery module comprising an enclosure, a plurality of series connected battery cells contained within said enclosure and defined by a first battery cell, at least one intervening battery cell, and a last battery cell, a positive terminal, a negative terminal, a first relay contained within said enclosure and connected between a positive terminal of the last battery cell and the positive terminal of the battery module, wherein the first relay controls connection of said plurality of battery cells to a first of said terminals, a second relay contained within said enclosure and connected between a negative terminal of the first battery cell and the negative terminal of the battery module, wherein the first relay controls connection of said plurality of battery cells to a second of said terminals, and a battery management system having a digital communications port, said battery management system being configured to control said first relay and said second relay, said method comprising:

receiving a first message at the first relay and the second relay that is communicated from the battery management system via said digital communications port, wherein the first message corresponds to a first activation command to activate the first relay and the second relay;

activating said first relay to connect a first one of said plurality of series connected battery cells to said positive terminal of said battery module in response to receiving said first message;

activating said second relay to connect a second one of said plurality of series connected battery cells to said negative terminal of said battery module in response to receiving said first message;

setting an activated duration period based on information contained in said received first message;

checking for expiration of the activated duration period;

responsive to the activation duration period not having expired, checking for receipt of a second message, wherein the second message corresponds to a second activation command to activate the first relay and the second relay;

in response to receiving the second message, setting a new activated duration period based on information contained in said received second message;

and deactivating said first relay and said second relay to disconnect said plurality of series connected battery cells from both said positive terminal of the battery module and said negative terminal of the battery module in response to expiration of the activation duration period before the second message is received.

12. The method of claim 11, wherein said activation duration period is set in response to a measured voltage between said negative terminal of the battery module and said positive terminal of the battery module exceeding a threshold voltage.

13. The method of claim 11, wherein said battery module further comprises a visual indicator, and wherein said step of activating said first relay further comprises setting said visual indicator responsive to activation status of said first relay.

14. A modular battery pack comprising:
a plurality of modules;
a pack controller;
a positive power bus having a first plurality of connectors;
a negative power bus having a second plurality of connectors; and
a control bus coupled to the pack controller,
wherein each said module further comprises:
an enclosure,
a plurality of series connected battery cells contained within said enclosure, said plurality of series connected battery cells being electrically isolated from said enclosure, and wherein the plurality of series connected battery cells is defined by a first battery cell, at least one intervening battery cell, and a last battery cell, a positive terminal configured to be coupled to the positive power bus of the modular battery pack via a first connector, said first connector being one of the first plurality of connectors;

a negative terminal configured to be coupled to the positive power bus of the modular battery pack via a second connector, said second connector being one of the second plurality of connectors;

a first relay contained within said enclosure and connected between a positive terminal of the last battery cell and the positive terminal of the battery module, wherein the first relay controls connection of said plurality of series connected battery cells to said positive terminal;

a second relay contained within said enclosure and connected between a negative terminal of the first battery cell and the negative terminal of the battery module, wherein the second relay controls connection of said plurality of series connected battery cells to said negative terminal; and a control bus connection that provides a control signal input for activating said first relay and said second relay, said control bus connection being electrically isolated from said plurality of battery cells, wherein the positive terminal of each of the said plurality of modules is coupled to the positive power bus via the respective first connector, wherein the negative terminal of each of the said plurality of modules is coupled to the positive power bus via the respective second connector, wherein the control bus connection of each of the said plurality of modules is connected to said control bus that is coupled to the pack controller, and wherein the plurality of series connected battery cells are connected to the positive terminal of the battery module and the negative terminal of the battery module in response to said first relay and said second relay receiving the control signal input.

15. The modular battery pack of claim 14, said module further comprising a third relay, wherein said third relay controls connection between said plurality of battery cells and at least one of said terminals, via a current-limiting circuit.

16. The modular battery pack of claim 14, wherein each said module further comprises a visual indicator responsive to activation status of at least one of said relays.

* * * * *